United States Patent [19]

Kurita

[11] Patent Number: 5,557,421
[45] Date of Patent: Sep. 17, 1996

[54] APPARATUS FOR PROGRAMMING A VIDEO TAPE RECORDER

[75] Inventor: Tohru Kurita, Kanagawa, Japan

[73] Assignee: Sony Corporation, Tokyo, Japan

[21] Appl. No.: 283,740

[22] Filed: Aug. 1, 1994

Related U.S. Application Data

[63] Continuation of Ser. No. 65,154, May 21, 1993, abandoned.

[30] Foreign Application Priority Data

May 29, 1992 [JP] Japan .................................. 4-139362

[51] Int. Cl.$^6$ .............................. H04N 5/76; H04N 5/232
[52] U.S. Cl. ........................................... 358/335; 348/211
[58] Field of Search ...................... 358/335, 310, 358/342; 360/33.1, 35.1; 348/211, 636, 114; 455/4.1, 4.2

[56] References Cited

U.S. PATENT DOCUMENTS 4,977,455  12/1990  Young ..................................... 358/142

FOREIGN PATENT DOCUMENTS 2005070  11/1989  Canada .

Primary Examiner—Thai Q. Tran
Assistant Examiner—Robert Chevalier
Attorney, Agent, or Firm—Jay H. Maioli

[57] ABSTRACT

Information in which data concerning video programming is converted into a sequence of numerals is supplied from a key operation unit (11) to a decoder circuit (22) that decodes data concerning video programming of a television program. A code representative of a video tape recorder (VTR) that effects video programming designated by an input (12) is supplied to an identifying circuit (23). An identified output from the identifying circuit (23) is supplied through a data bus (24) to a central processing unit (CPU) (25). A signal from the CPU (25) is supplied to the decoder circuit (22), and decoded data concerning video programming of television program is supplied to a format converting circuit (26). The signal from the CPU (25) is supplied to the converting circuit (26), which forms video programming data suitable for the above identified VTR. A signal from the converting circuit (26) is supplied to a transmitter (3), in which it is modulated to form an arbitrary infrared signal or the like and then transmitted. Thus, video programming can be reliably carried out by a simple operation.

2 Claims, 7 Drawing Sheets

APPARATUS FOR PROGRAMMING A VIDEO TAPE RECORDER

This is a continuation of application Ser. No. 08/065,154, filed May 21, 1993, now abandoned.

BACKGROUND OF THE INVENTION

1. Field of the Invention

The present invention relates to a video programing apparatus for use in ejecting a video programing on a video tape recorder (VTR).

2. Description of the Relevant Art

Relatively complex operation is generally required to effect a timer-activated recording (hereinafter referred to as a video programing) on a video tape recorder and such video programing tends to become troublesome to the user. To remove the above disadvantage, there is proposed a video programing apparatus in which data concerning video programing of television (or broadcasting) program is converted into an arbitrary sequence of numerals and this sequence of numerals is input by a key operation unit to thereby effect a video programing.

One conventional apparatus for effecting a video programming incorporates therein a memory and a timer. When the recording is started, the video programming apparatus outputs a remote control signal that powers a VTR on the basis of decoded data of the above sequence of numerals, a remote control signal that selects a channel and then a remote control signal for starting the recording sequentially. When the recording is ended, the video programming apparatus outputs a remote control signal that ends the recording and then outputs a remote control signal that turns a power switch of the VTR off.

According to this conventional apparatus, however, a control operation is carried out in a one-sided fashion regardless of the condition of the VTR. Therefore, if a tape on which the recording can be effected is not loaded into the VTR or if a transmission and/or reception of the remote control signal is interrupted, there is then the risk that the recording will not be executed. Further, there is the risk that the recording will be interrupted by a remote control signal transmitted from other apparatus during the recording. Furthermore, the conventional video programming apparatus cannot control a plurality of VTRs at the same time.

Consumer VTRs adopt the following video programming method. That is, data concerning video programming is input by a transmission unit that transmits a remote operation control signal and video programming data is formed from the input data. Then, the video programming data is transmitted to a VTR body to thereby effect the video programming. However, this conventional method requires a complex input operation and such input operation is very cumbersome for the user similarly to the aforesaid case that the video programming is effected on the VTR body.

OBJECTS AND SUMMARY OF THE INVENTION

Therefore, it is an object of the present invention to provide an improved video programming apparatus in which the aforesaid shortcomings and disadvantages encountered with the prior art can be eliminated.

More specifically, it is an object of the present invention to provide video programming apparatus in which a video programming can be reliably carried out by a simple operation.

According to a first aspect of the present invention, there is provided a video programming apparatus which comprises a key operation unit for inputting information in which data concerning video programming of a television program is converted into an arbitrary sequence of numerals, an input device for inputting a code that designates a video tape recorder for effecting the video programming together with the information, and a video programming data forming circuit for decoding the information and identifying the code to thereby form video programming data suitable for the video tape recorder, wherein the video programming data forming circuit is provided in a remote operation control transmitting unit.

According to a second aspect of the present invention, there is provided a video programming apparatus which comprises a key operation unit for inputting information in which data concerning video programming of a television program is converted into an arbitrary sequence of numerals, an input device for inputting a code that designates a video tape recorder for effecting the video programming together with the information, and a video programming data forming circuit for decoding the info,nation and identifying the code to thereby form video programming data suitable for the video tape recorder, wherein the video programming data forming circuit is provided on the video tape recorder.

As described above, the arbitrary sequence of numerals into which the data concerning the video programming of the television program is converted is decoded and the code that designates the VTR is identified. Then, the video programming data suitable for the identified VTR is formed. Therefore, the video programming can be reliably carried out by the simple operation.

The above and other objects, features and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

The present invention will now be described with reference to the drawings.

Figure 1:
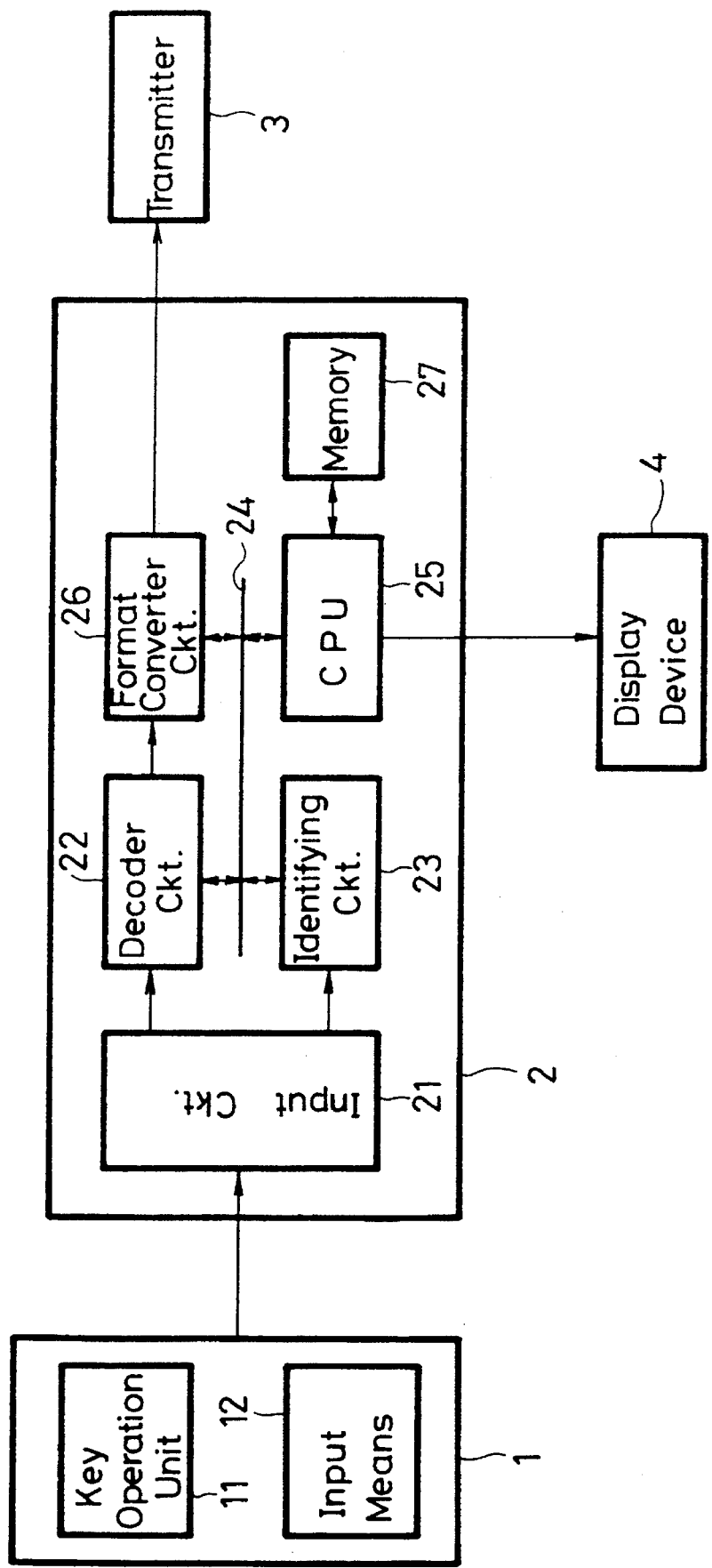
FIG. 1 is a block diagram showing a circuit arrangement of a video programming apparatus according to an embodiment of the present invention.

FIG. 1 of the accompanying drawings shows in block form a circuit arrangement of a video programming apparatus according to an embodiment of the present invention.

As shown in FIG. 1, there is provided a key operation unit 11 that is used to input information in which data concerning a video programming of a television program is converted into an arbitrary sequence of numerals. An input means 12 is adapted to input a code that designates a VTR on which the video programming is effected. The key operation unit 11 and the input means 12 are integrally formed with a keyboard 1 which derives a series of outputs corresponding to respective key operations. Though not shown, the keyboard 1 includes an information input start key, a correction key, an end key, a transfer key or the like, each of which is used to input information. The keyboard 1 further includes keys for operating other VTRs, though not shown.

Referring to FIG. 1, an output from the keyboard 1 is supplied to an input circuit 21 of a microcomputer 2, from which there are separately obtained the output of the key operation unit 11 and the output of the input means 12. Information from the key operation unit 11 is supplied to a decoder circuit 22 that decodes data concerning video programming of a television program. A code from the input means 12 is supplied to an identifying circuit 23 that identifies the VTR on which the video programming is effected. An identified output supplied from the identifying circuit 23 to represent the VTR on which the designated video programming is effected is supplied through a data bus 24 to a central processing unit (CPU) 25.

A signal from the CPU 25 is supplied to the decoder circuit 22 which decodes the information supplied thereto from the key operation unit 1. The decoded data concerning the video programming of a television program from the decoder circuit 22 is supplied to a format converter circuit 26. The format converter circuit 26 is supplied with the signal from the CPU 25 and forms video programming data suitable for the identified VTR. Programs for format conversion, etc., are written in a memory 27.

The signal from the format converter circuit 26 is supplied to a transmitter 3, in which it is modulated to an arbitrary infrared signal or the like and then transmitted. The signal from the CPU 25 is supplied to a display device 4 which displays thereon decoded data concerning the video programming of the television program.

Figure 2A:
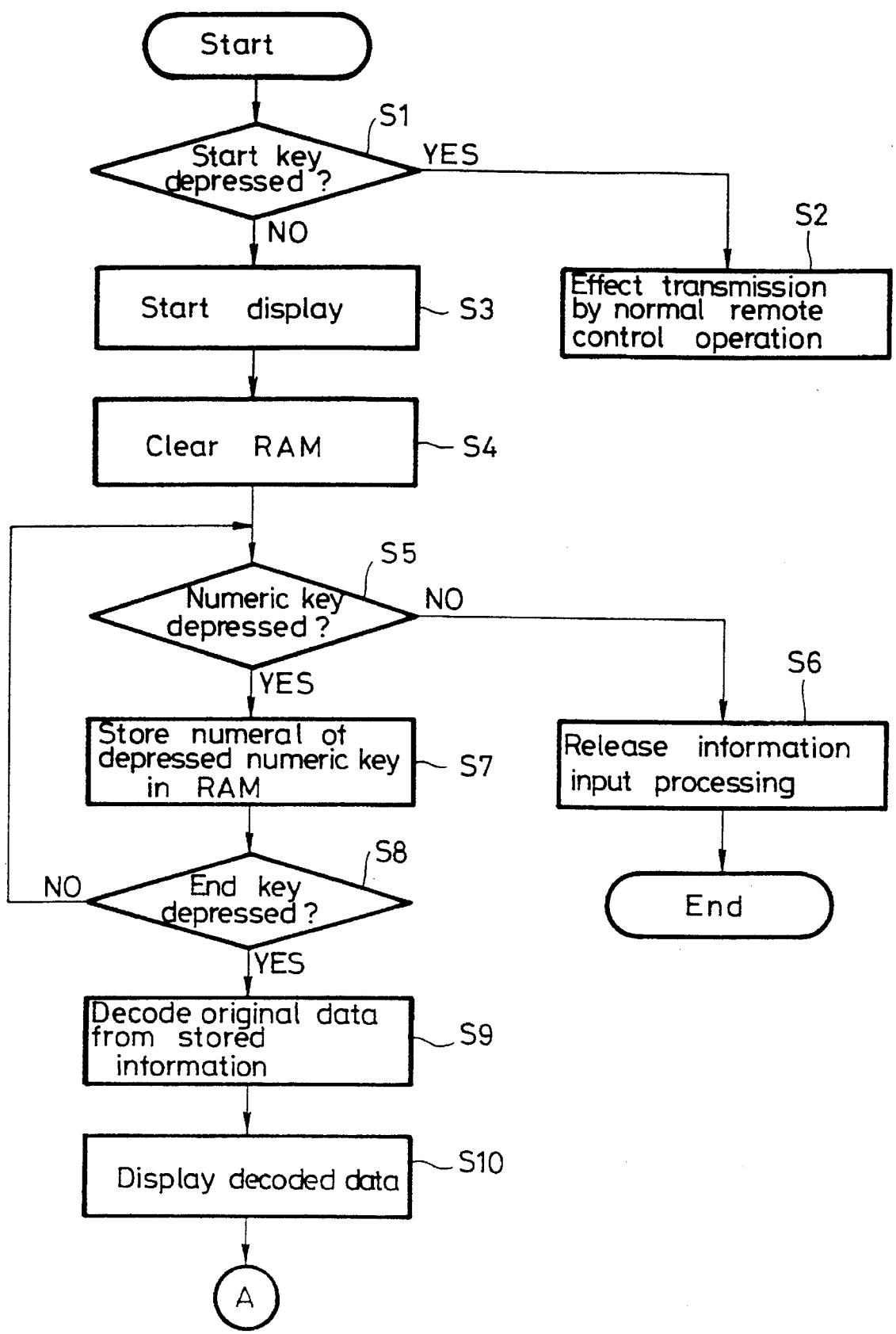
FIG. 2 (formed of FIGS. 2A and 2B) is a flowchart to which references will be made in explaining operation of the apparatus shown in FIG. 1.
Figure 2B:
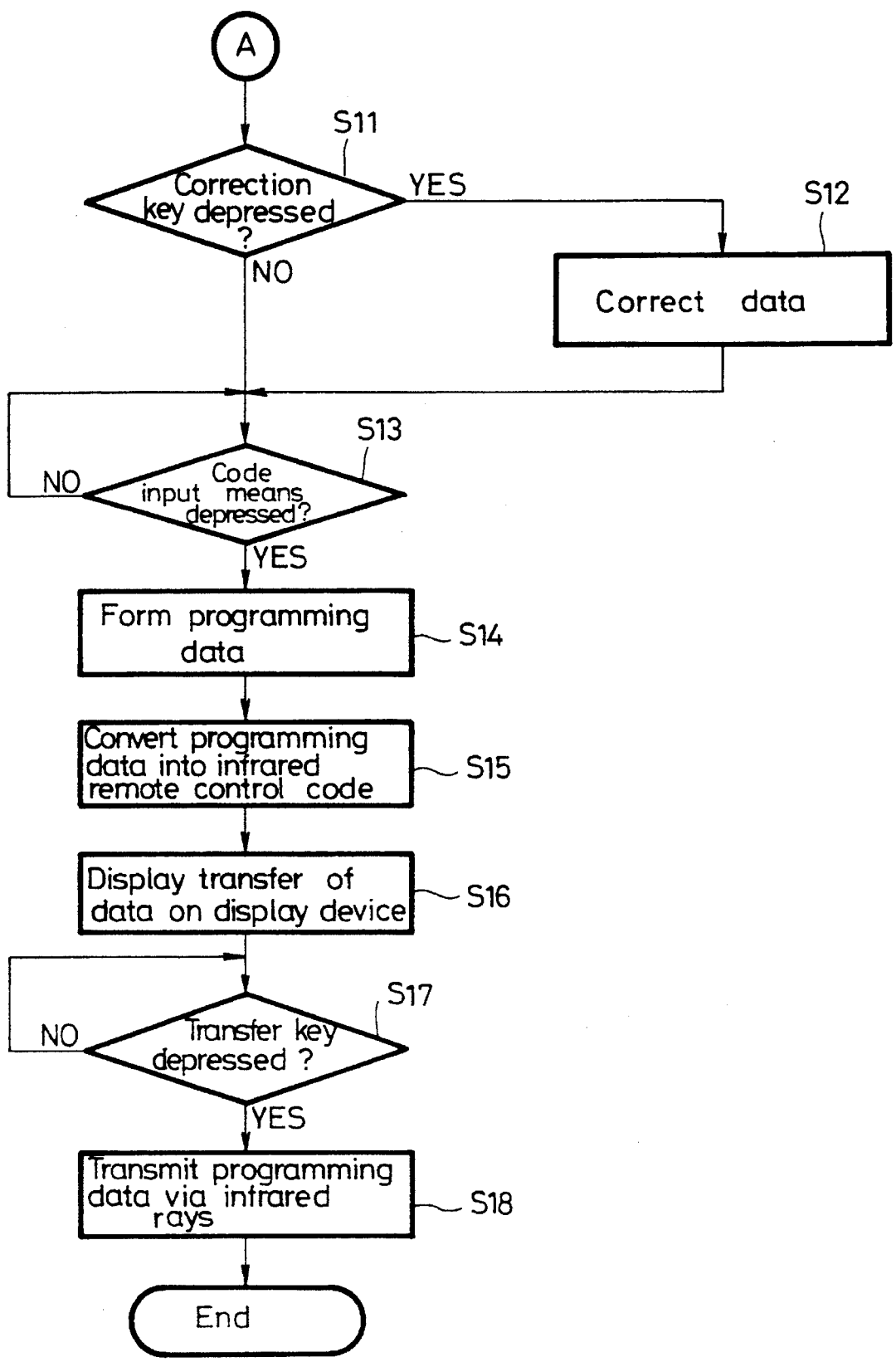

The aforesaid video programming apparatus is operated and driven as shown in a flowchart forming FIG. 2. FIG. 2 is formed of FIGS. 2A, 2B drawn on two sheets of drawings so as to permit the use of a suitable large scale.

Referring to FIG. 2A, following the start of operation, it is determined in decision step S1 whether or not the information input start key is depressed. If the start key is not depressed as represented by a NO at decision step S1, then the processing proceeds to the next step S2, whereat the normal transmission is effected by a remote control operation.

If the start key is depressed as represented by a YES at decision step S1, then the processing proceeds to step S3, whereat the display on the display device 4 is started. In the next step S4, a RAM (random access memory) provided within the memory 27 is cleared. Then, it is determined in the next decision step S5 whether or not the numeric key on the key operation unit 11 is depressed. If the numeric key is not depressed as represented by a NO at decision step S5, then the processing proceeds to step S6, whereat the processing for the information input is released. Then, the whole operation is ended.

If the numeric key is depressed as represented by a YES at decision step S5, then the processing proceeds to decision step S7, whereat a numeral of the depressed numeric key is stored in the RAM. In the next decision step S8, it is determined whether or not the information end key is depressed. If the information end key is not depressed as represented by a NO at decision step S8, then the processing returns to step S5. If the information end key is depressed as represented by a YES at decision step S8, then the processing proceeds to step S9, whereat original data concerning the video programming of a television program is decoded from the information stored in the RAM. Then, the decoded data is displayed on the display device 4 in step S10.

Further, it is determined in decision step S11 whether or not the information correction key is depressed. If the information correction key is depressed as represented by a YES at decision step S11, then the processing proceeds to step S12, whereat data is corrected. If the correction key is not depressed as represented by a NO at decision step S111, then the processing proceeds to the next decision step S13, whereat it is determined whether or not the code input means for inputting a code that designates the VTR on which the video programming is effected is depressed. If the code input means is not depressed as represented by a NO at decision step S13, then the processing in step S13 is repeated until the code input means is depressed. If on the other hand the code input means is depressed as represented by a YES at decision step S13, then the processing proceeds to step S14, whereat video programming data suitable for the designated VTR is formed.

Further, in the next step S15, the video programming data thus formed is converted into an infrared remote control code, for example. In step S16, a display of transfer is effected on the display device 4. Then, it is determined in the next decision step S17 whether or not the transfer key is depressed. If the transfer key is depressed as represented by a YES at decision step S17, then the processing proceeds to the next step S18, whereat the video programming data suitable for the designated VTR is transmitted via infrared rays and then the whole operation is ended. If the transfer key is not depressed as represented by a NO at decision step S17, then the processing in step S17 is repeated until the transfer key is depressed.

The video programming data thus transmitted is stored in a video programming memory of the VTR similarly to the conventional video programming data and the recording is executed at a desired video programming time.

As described above, according to the video programming apparatus of the present invention, the arbitrary sequence of numerals in which the data concerning the video programming of television program is converted is decoded by the decoder circuit 22, and the code that designates the VTR is identified by the identifying circuit 23. Also, the video programming data suitable for the identified VTR is formed by the converter circuit 26. Therefore, the video programming can be reliably carried out by the simple operation.

In the above-mentioned video programming apparatus, the input key operation unit 11 that inputs the information into which data concerning the video programming of a television program is converted into the arbitrary sequence of numerals and the code input means 12 that designates the VTR on which the video programming is effected may be included in a transmitting unit 100 that transmits a remote operation control signal.

Figure 3:
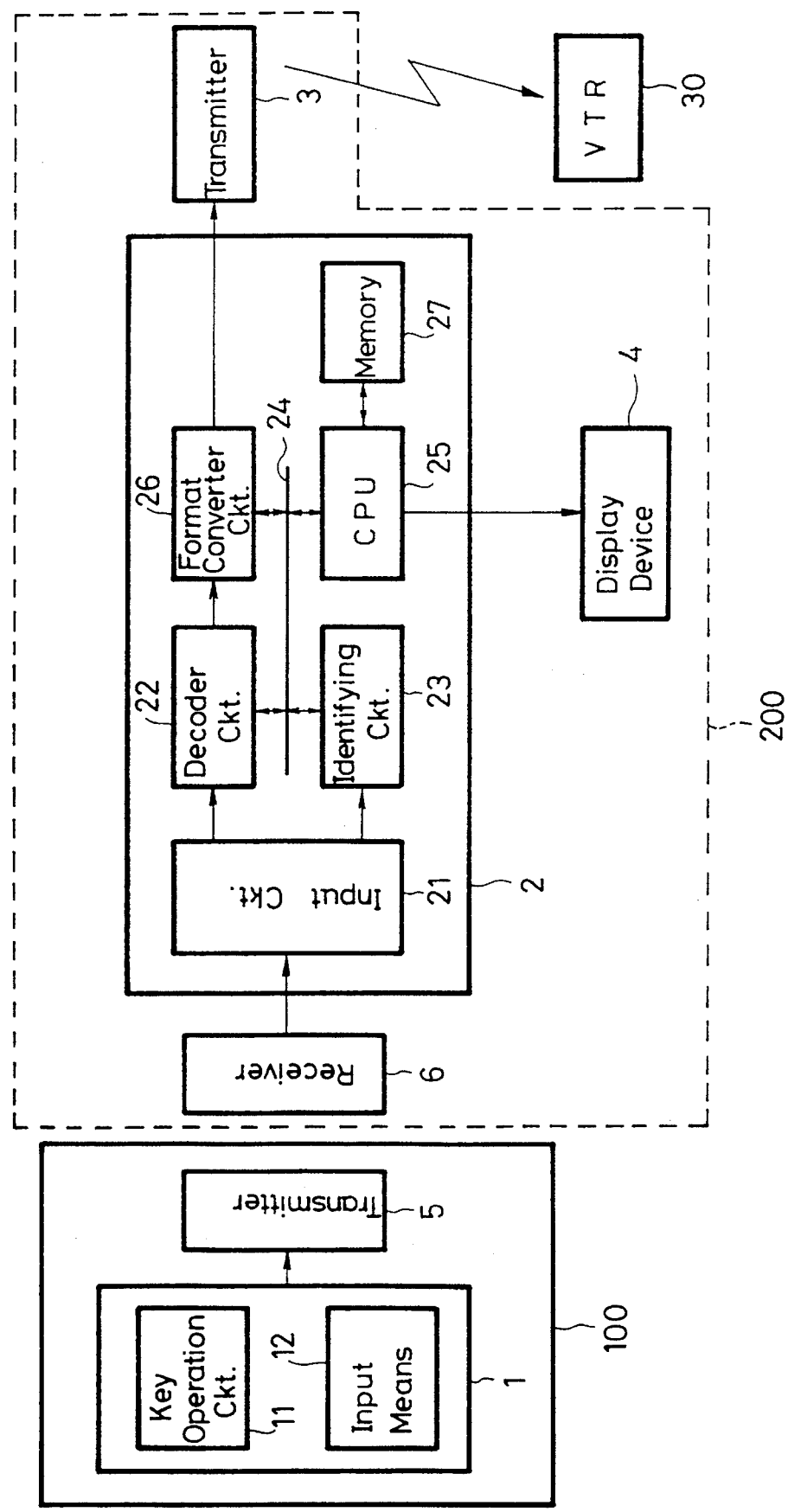
FIG. 3 is a block diagram showing a circuit arrangement of a video prographing apparatus according to another embodiment of the present invention.

FIG. 3 shows in block form the video programming apparatus according to another embodiment of the present invention, in which the key operation unit 11 and the code input means 12 are included within the transmitting unit 100. In this embodiment, a control center 200 is interposed between the remote control apparatus and a VTR 30. As shown in FIG. 3, the keyboard 1 that includes the key operation unit 11, the input means 12 or the like is provided within the remote operation control transmitting unit 100. A signal from the keyboard 1 is supplied to the transmitter 5, in which it is converted into an infrared remote operation code and then transmitted via infrared rays. There is provided a receiver 6 which receives the infrared remote operation code transmitted from the transmitter 5. A signal from the receiver 6 is supplied to the input circuit 21 of the microcomputer 2. Then, the remote operation control code is decoded within the microcomputer 2. The decoded remote operation control code is converted into a desired VTR code and supplied to the transmitter 3. Then, a control signal is transmitted from the transmitter 3 to the desired VTR 30.

Figure 4A:
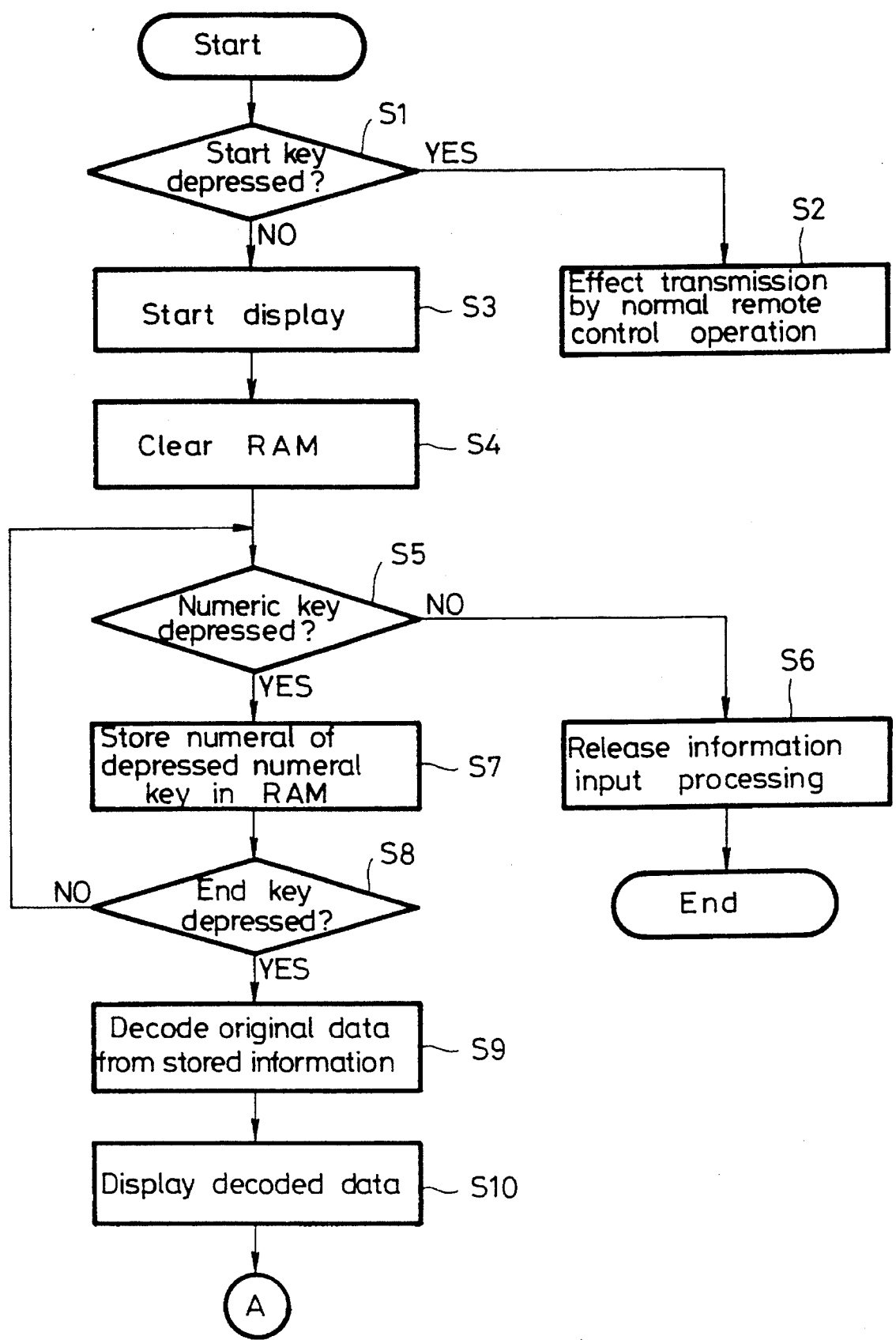
FIG. 4 (formed of FIGS. 4A, 4B and 4C) is a flowchart to which references will be made in explaining operation of the apparatus shown in FIG. 3.
Figure 4B:
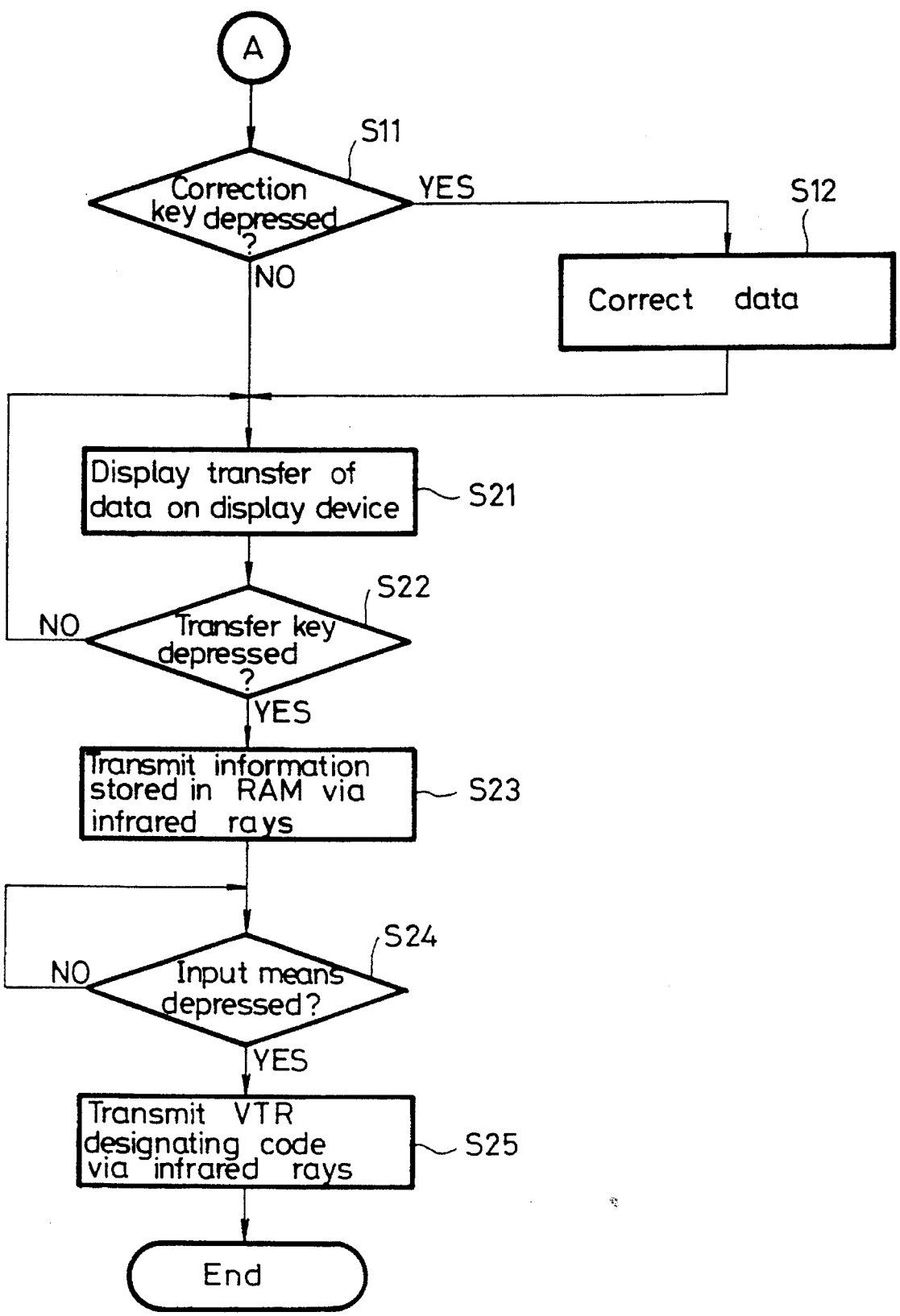
Figure 4C:
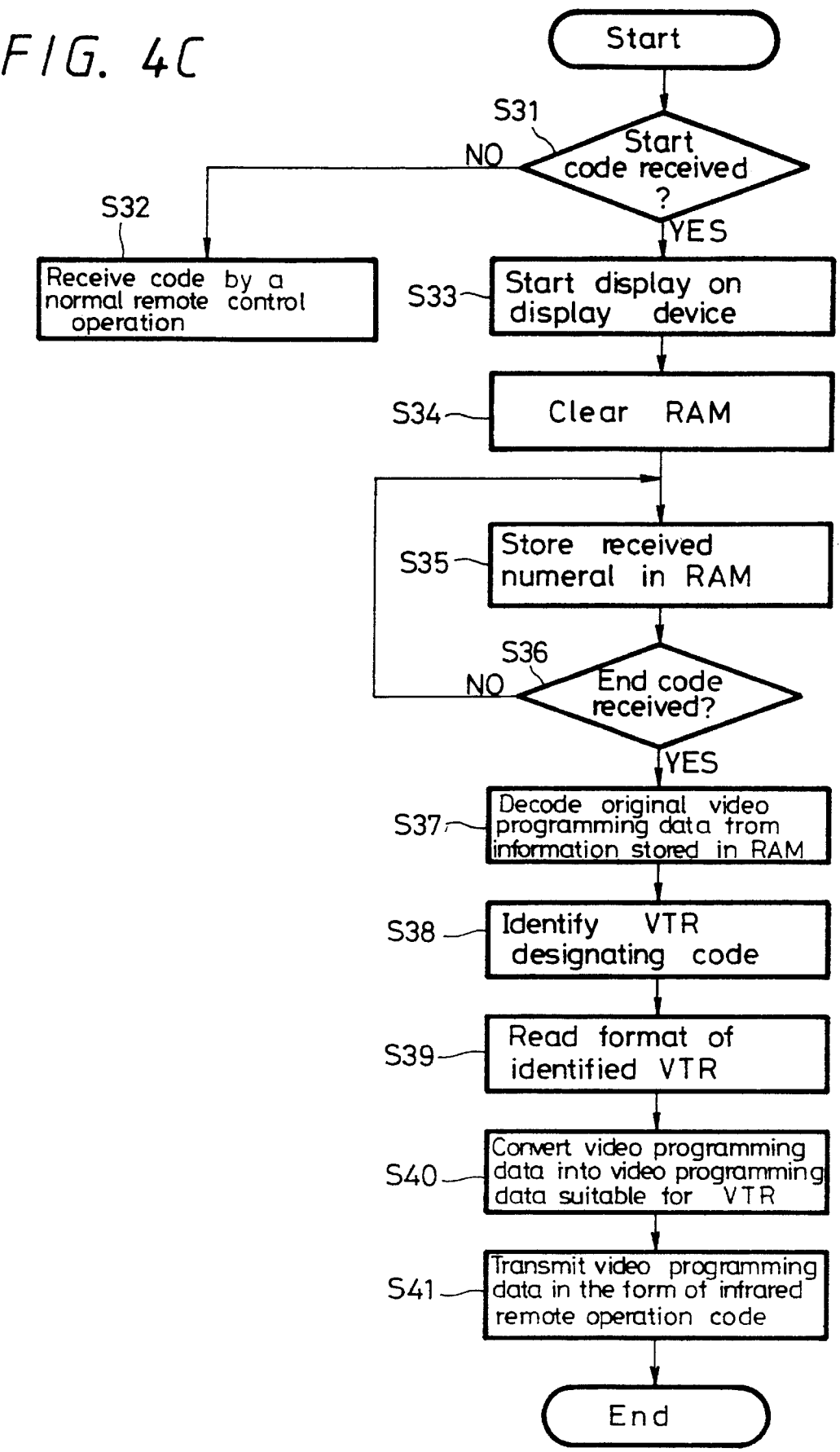

This video programming apparatus will be operated and driven in accordance with a flowchart forming FIGS. 4A, 4B and 4C. In FIGS. 4A, 4B and 4C, FIG. 4A shows a flowchart used to explain the operation and driving of the transmitting unit 100 side. The processing up to step 12 in FIGS. 4A, 4B is similar to that of FIGS. 2A, 2B and therefore need not be described.

Referring to FIG. 4B, the transfer of data is displayed on the display device 4 at step S21. Then, it is determined in decision step S22 whether or not the transfer key is depressed. If the transfer key is depressed as represented by a YES at decision step S22, then the processing proceeds to step S23, whereat the information stored in the RAM is transmitted via infrared rays. It is determined in the next decision step S24 whether or not the input means that inputs the code for designating the VTR on which the video programming is effected is depressed. If the input means is depressed as represented by a YES at decision step S24, then the processing proceeds to the next step S25, whereat the code that designates the VTR is transmitted via infrared rays. Then, the whole operation is ended. If the input means is not depressed as represented by a NO at decision step S24, then the processing in step S24 is repeated until the input means is depressed.

FIG. 4C shows a flowchart to which references will be made in explaining operation of the microcomputer 2. Referring to FIG. 4C, following the start of operation, it is determined in decision step S31 whether or not an information input start code is received. If not as represented by a NO at decision step S31, then the processing proceeds to step S32, whereat a code is received in a normal remote control operation fashion.

If on the other hand the start code is received as represented by a YES at decision step S31, then the processing proceeds to step S33, whereat the display on the display device 4 is started. In the next step S34, the RAM provided within the memory 27 is cleared. In the next step S35, the received numeral is stored in the RAM. It is determined in the next decision step S36 whether or not the information end code is received.

If the information end code is not received as represented by a NO at decision step S36, then the processing returns to step S35. If on the other hand the end code is received as represented by a YES at decision step S36, then the processing proceeds to the next step S37, wherein the original data concerning the video programming of television program is decoded from the information stored in the RAM. In the next step S38, a code that designates the VTR on which the video programming is effected is identified. Then, a format of the identified VTR is read at step S39.

Further, in the next step S40, the decoded data concerning the video programming of television program is converted into the video programming data that is suitable for the identified VTR. Then, in step S41, the thus formed video programming data is converted into the infrared remote operation code, for example, and transmitted. Then, the whole operation is ended.

As described above, the arbitrary sequence of numerals into which the data concerning the video programming of a television program is converted is decoded and the code that designates the VTR is identified. Then, the video programming data suitable for the identified VTR is formed. Therefore, the video programming can be reliably carried out by the simple operation.

In the above-mentioned video programming apparatus, the circuit arrangement of the microcomputer 2 may be provided within the VTR.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A video programming apparatus comprising:

at least one video tape recorder;

an input unit including a key operation unit for operation by a user to input data information concerning video programming of a television program, wherein said data information is represented as an arbitrary sequence of numerals, and input means for operation by the user to input a code that designates a selected one of said at least one video tape recorder for effecting said video programming corresponding to said data information; and a control unit including decoding means for decoding said data information from said key operation unit, identifying means for identifying said selected one of said at least one video tape recorder that corresponds to said code input by said input means to thereby form video programming data suitable for controlling said selected one of said at least one video tape recorder, and transmitting means for transmitting said video programming data to said at least one video tape recorder.

2. A video programming apparatus comprising:

at least one video tape recorder;

a remote controller including a key operation unit for inputting data information represented as an arbitrary sequence of numerals identifying video programming of a television program, input means for selecting one of said at least one video tape recorder by inputting a code corresponding to the selected one of said at least one video tape recorder for effecting said video programming therein, and a first infrared signal transmission means for transmitting said data information and said code; and a control unit including means for receiving said data information and said code from said first transmitting means of said remote controller, video programming data forming means for decoding said data information and for identifying said code to thereby form video programming data for the selected one of said at least one video tape recorder, and second infrared signal transmitting means for transmitting said video programming data from said control unit to said at least one video tape recorder to execute said video programming in accordance with said data information input to said remote controller.

* * * * *